(12) United States Patent
Söderberg et al.

(10) Patent No.: US 10,132,005 B2
(45) Date of Patent: Nov. 20, 2018

(54) METHOD OF SPINNING FIBRES OR EXTRUSION, AND THE PRODUCTS OBTAINED (71) Applicant: RISE Innventia AB, Stockholm (SE)

(72) Inventors: Daniel Söderberg, Täby (SE); Fredrik Lundell, Österskär (SE); Andreas Fall, Stockholm (SE); Karl Håkansson, Stockholm (SE); Mathias Kvick, Stockholm (SE); Lars Wågberg, Lidingö (SE)

(73) Assignee: RISE Innventia AB, Stockholm (SE)

( * ) Notice: Subject to any disclaimer, the term of this patent is extended or adjusted under 35 U.S.C. 154(b) by 561 days.

(21) Appl. No.: 14/437,406

(22) PCT Filed: Oct. 22, 2013

(86) PCT No.: PCT/SE2013/051227
§ 371 (c)(1),
(2) Date: Apr. 21, 2015

(87) PCT Pub. No.: WO2014/065747
PCT Pub. Date: May 1, 2014

(65) Prior Publication Data
US 2015/0292114 A1 Oct. 15, 2015

Related U.S. Application Data (60) Provisional application No. 61/716,905, filed on Oct. 22, 2012.

(51) Int. Cl.
*D01D 5/06* (2006.01)
*D01D 5/14* (2006.01)
(Continued)

(52) U.S. Cl.
CPC ............ *D01D 5/06* (2013.01); *C01B 32/158* (2017.08); *C01B 32/16* (2017.08); *D01D 5/14* (2013.01);
(Continued)

(58) Field of Classification Search
CPC .... D01D 5/06; D01D 5/14; D01F 2/00; D01F 4/00; D01F 9/12; D01F 8/02
See application file for complete search history.

(56) References Cited

U.S. PATENT DOCUMENTS 3,943,220 A    3/1976  Barnett et al.
6,248,267 B1 * 6/2001  Hosako .................... D01D 5/40
                                               264/11
(Continued)

FOREIGN PATENT DOCUMENTS

EP    2667438 A1   11/2013
GB     441440 A    1/1936
(Continued)

OTHER PUBLICATIONS

Jalili, et al., Scalable One-Step Wet-Spinning of Graphene Fibers and Yarns from Liquid Crystalline Dispersions of Graphene Oxide: Towards Multifunctional Textiles; Advanced Functional Materials, 2013, vol. 23, pp. 5345-5354, Wiley.

(Continued)

*Primary Examiner* — Holly C Rickman
(74) *Attorney, Agent, or Firm* — Pearne & Gordon LLP (57) ABSTRACT The invention relates to a continuous, scalable and parallelizable method for preparing strong and stiff fibers (filaments) or films. The fiber or film is prepared by utilizing hydrodynamically induced alignment of the constituents of a dispersion in combination with surface-charge controlled gel transition to produce fibers with a high degree of (Continued)

alignment of the constituents (polymer(s), fibrils etc). The invention also relates to the fibers or films so formed.

17 Claims, 5 Drawing Sheets

(51) Int. Cl.
```
D01D 5/40      (2006.01)
D01F 9/14      (2006.01)
D01F 2/00      (2006.01)
D01F 4/00      (2006.01)
D01D 5/38      (2006.01)
C01B 32/158    (2017.01)
C01B 32/16     (2017.01)
```

(52) U.S. Cl.
CPC ............... *D01D 5/38* (2013.01); *D01D 5/40* (2013.01); *D01F 2/00* (2013.01); *D01F 4/00* (2013.01); *D01F 9/14* (2013.01); *D10B 2101/122* (2013.01)

(56) References Cited

U.S. PATENT DOCUMENTS

| | | | |
|---|---|---|---|
| 2003/0137069 A1* | 7/2003 | Reneker | D01D 5/0985 264/29.1 |
| 2008/0124507 A1 | 5/2008 | Poulin et al. | |
| 2010/0056731 A1* | 3/2010 | Hendriks | C08L 77/10 525/420 |
| 2010/0196250 A1 | 8/2010 | Derre et al. | |
| 2011/0110843 A1 | 5/2011 | Pasquali et al. | |

FOREIGN PATENT DOCUMENTS

| | | |
|---|---|---|
| JP | H02200810 A | 8/1990 |
| WO | 9409190 A1 | 4/1994 |
| WO | 0138614 A1 | 5/2001 |
| WO | 2004074558 A1 | 9/2004 |
| WO | 2006137893 A2 | 12/2006 |
| WO | 2007141131 A1 | 12/2007 |
| WO | 2011134717 A1 | 11/2011 |

OTHER PUBLICATIONS

Fall, et. al., A physical cross-linking process of cellulose nanofibril gels with shear-controlled fibril orientation; Soft Matter, 2013, vol. 9, pp. 1852-1863, RSC Publishing.

Liu, et al., Properties of Biocomposite Fibers from Cellulose Nanowhiskers and Cellulose Matrix; Journal of Fiber Bioengineering & Informatics, 2012, vol. 5, No. 2, pp. 207-215, Binary Information Press & Textile Bioengineering and Informatics Society.

Iwamoto, et. al., Structure and Mechanical Properties of Wet-Spun Fibers Made from Natural Cellulose Nanofibers; BioMacromolecules, 2011, vol. 12, pp. 831-836, ACS Publications.

Breslauer, David N., Biologically-inspired Microfluidic Silk Spinning, a proposal submitted for the 2007 Bears Breaking Boundaries Contest, UCSF/UC Berkeley Bioengineering Graduate Group, pp. 1-13, retrieved on Apr. 23, 2007.

International Search Report issued in International PCT Application No. PCT/SE2013/051227, published May 1, 2014.

Written Opinion issued in International PCT Application No. PCT/SE2013/051227, dated Feb. 4, 2014.

International Preliminary Report on Patentability issued in International PCT Application No. PCT/SE2013/051227, dated Sep. 29, 2014.

Extended European Search Report dated May 31, 2016 for EP 13848749.1.

* cited by examiner

METHOD OF SPINNING FIBRES OR EXTRUSION, AND THE PRODUCTS OBTAINED

FIELD OF INVENTION

The present invention relates to the field of spinning or extruding fibres or films, and in particular to a method of manufacturing an oriented fibre or film. The invention also pertains to the fibre or film manufactured.

BACKGROUND

Many biological materials show impressive and controllable properties that are determined by their micro and nanostructure. Cellulose fibres extracted from wood and spider silk represent two excellent examples. The main constituent of cellulose fibres is the nano-scale fibril, which has the prospective of being a building block for future high-performance bio-based materials and textiles and/or to provide a template for functional nano-materials. However, processes that enable full utilisation of the potential of the fibrils are yet to be developed. The fibrils in cellulose fibres from wood are organised in a nano-scale lamellar structure having a highly ordered spiralling orientation along the fibre axis. The fibres demonstrate high ultimate strength and stiffness that vary in a wide range depending on the mean fibril orientation. In the tree, the fibril orientation also varies through the thickness of the stem so that the mechanical performance of the tree is maximized.

The fibrils of cellulose fibres can be separated by several methods (1) to produce nano-fibrillated cellulose (NFC) and recently, films and filaments have been manufactured from NFC with promising properties (2, 3, 4). However, the properties obtained are far from the maximum values reported for individual cellulose fibres liberated from wood.

In order to manufacture materials such as fibre-composite materials and textiles there is a need for manufacturing methods for fibres (threads). Specifically, there is a need for environmentally friendly methods using fewer chemicals that can make fibres from bio-based polymers.

Wet spinning of fibres (filaments) is performed in an apparatus where a raw spinning liquid is discharged from a nozzle into a coagulation liquid where a fibre is formed. The raw spinning liquid is commonly prepared by dissolution of constituents into a suitable solvent. These substances typically are non-spherical, which contributes the properties of the final fibres. The spinning liquid is injected through a nozzle, i.e. the spinnaret, into a bath where a coagulation liquid is contained. The injection can be directly into the coagulation liquid by submersion of the nozzle into the coagulation liquid or into the coagulation liquid after passing through a gas such as air.

Typically a drawing roll is immersed at the other end in the spinning bath. The spinning raw liquid discharged from the nozzle (i.e. the spinnaret) is coagulated by the coagulation liquid and thus formed into a coagulated fibre (filament), which can be drawn out of the spinning bath using the drawing roll. The coagulated fibres (coagulated filaments) solidified in the spinning bath are separated from the coagulation liquid, washed, and transferred to subsequent steps such as chemical liquid treatment, drying, and thermal treatment. As an improvement to the process, coagulation liquid has been applied already in the spinnaret, as disclosed in e.g. Patents GB1087212 and U.S. Pat. No. 2,510,135. This process can be performed for single fibres (monofilament) or a multitude of fibres in parallel (multifilament).

In order to meet product requirements regarding fibre mechanical properties such as strength, it has proven to be beneficial to achieve alignment of the constituents within the spun fibre. Furthermore, in order to achieve alignment of the constituents (polymers, fibrils, etc.) there are two main approaches used:

1) The constituents are stretched after coagulating/gelling of the fibre produced has been initiated. This causes the constituents to be elongated and the constituents aligned in the direction of the fibre. There are two routes for this stretching:
   a) Mechanically pulling the fibre in its gelled stated; or
   b) Using a co-flowing liquid flowing faster than the produced fibre, which pulls the fibre through shear forces excerpted on the developing surface of the fibre;
2) A nozzle designed with a specific geometry, i.e. a nozzle with a contraction, that aligns the constituents in the direction of the fibre produced.

These approaches typically need a sufficiently high viscosity of the spinning liquid to function and the co-flow needs to be significantly faster to achieve stretching. The above approaches (1a, 1b and 2) for achieving orientation of the constituents of the fibre can all be combined. As an example this is disclosed in patent application WO9724476.

In order to achieve a good final product it is preferred to achieve a uniform alignment of the constituents throughout the diameter of the fibres, i.e. the degree of alignment in the core of the fibre should be the same as at the surface of the fibre.

Regarding approach 1a, high shear or strain within the fibre, in the gelled or partly gelled state can cause local weakening of the fibre and thus inferior performance. This effect will be present regardless of type of constituent.

For the case of non-molecular constituents, such as fibrils, shear gradients within the liquid before gelling will also decrease alignment. The effect cannot be avoided and was described by Jeffery (1922) (5). The shear gradient within the liquid will force elongated particles such as fibrils to flip, i.e. rotate, and thus depart from the alignment to the direction of the flow. Furthermore, this effect of fibres forced to depart from the alignment with the flow is significantly enhanced in the presence of a solid surface, which was described by e.g. Holm and Söderberg (2005) (6), which showed that close to a solid surface, elongated particles will tend to orient perpendicular to the flow, i.e. the opposite of the desired alignment along the extent of the fibre.

The detrimental effects of shear gradients on alignment of non-molecular constituents will be present in approach 1b and 2 but not in approach 1a. Molecular substances such as polymers will most likely also be affected by the shear gradient albeit to a lesser degree.

The possibility, although only at higher concentrations, to manufacture fibres from fibrils, e.g. cellulose microfibrils, has been previously exploited and described, e.g. in U.S. Pat. No. 6,248,267, where a process for manufacturing of fibres based on the film-forming ability of the spinning liquid is revealed. This process is based on having a cellulose composition of less than 30 weight percent cellulose or similar matter moulded out from a nozzle into a reaction chamber where it is subjected to a coagulant spray. The preferred embodiments all identify concentrations above 5 weight percent or more. Furthermore, in order to achieve the shear needed in the described reaction chamber the coagulant spray should be co flowing with the spinning liquid with a preferred angle of 20°-80° where 0° corresponds to a coagulant spray in the same direction as the ejection of the spinning liquid from the nozzle.

It should also be noted that all the above mentioned patents and patent applications are characterised by having an axisymmetric design focused on spinning a predominantly cylindrical fibre, and can hence not be extended to form a film.

Specifically the coagulant flows are designed to reach the ejected spinning liquid from all directions, i.e. more or less axisymetrically. Furthermore, as mentioned above these spinning processes all depend on high-viscosity liquids, achieved by having high concentrations of the polymers, fibrils etc., where the surrounding co-flowing liquid has a viscosity at least one order of magnitude lower than the viscosity of the spinning liquid.

As is apparent from the above, there is a need for oriented fibres and films without local weakening or shear gradient. Moreover, there is a need for a method of manufacturing said fibres and films being less dependent on e.g. solvents.

SHORT DESCRIPTION OF THE FIGURES

FIG. 1 shows an illustration of continually controlled alignment followed by phase transition from liquid dispersion to gel, induced by electrolytes or acid. The fibrils in the focused central flow dispersion are illustrated as rods (fibril length is exaggerated by approximately a factor of 300). The diffusion of $Na^+$, from addition of NaCl in the aligning flow streams, is illustrated in shading. The rows of small images above and below the central image illustrate the hydrodynamical, molecular and electrochemical processes involved. (I) Brownian diffusion (illustrated with the dashed arrows) affects the orientation of a single fibril, (II) hydrodynamically induced alignment (illustrated by solid arrows) occurs during the acceleration/stretching, (III) Brownian diffusion continues to act after the stretching has ceased, (IV) Brownian diffusion is prevented by the transition to a gel. The lower row of small images illustrate how the electrostatic repulsion (illustrated underneath the central figure representing the Debye-length), decreases from (i) to (iv) as the Debye length is decreased with increasing $Na^+$ concentration.

FIG. 5 shows the mechanical performance of the fibres (overview in (a) and close-up in (b)), showing specific ultimate strength as a function of specific Young's modulus for a wide range of fibre materials as well as steel and aluminium. The filled, connected markers show data that have been obtained from stress-strain curves for bleached cellulose pulp fibres extracted from wood, from this point on denoted cellulose pulp fibres. More recent experiments (as indicated by the legend) report lower values and connected, filled circles and line must therefore be considered as extremely good values. The filled circles correspond to different mean angles between the fibrils and the fibre (nanofibril angle); this variation occurs naturally in different parts of a tree since the tree optimizes its structural integrity. The data points for cellulose pulp fibres appear near a line that also collects most other.

DESCRIPTION OF THE INVENTION

The present invention relates to a continuous, scalable and parallelizable method for preparing strong and stiff fibres (filaments) or films. The fibre or film is prepared by utilizing hydrodynamically induced alignment of the constituents of a dispersion in combination with surface-charge controlled gel transition to produce fibres with a high degree of alignment of the constituents (polymer(s), fibrils etc).

Accordingly, in accordance with the invention there is provided a method of spinning fibres or extrusion, comprising a) Injection of a central flow dispersion comprising long-chained polymer(s) or non-spherical particles into a central flow channel of a reaction chamber;

b) Acceleration of the central flow in the reaction chamber by at least two opposite, aligning flow streams, essentially perpendicular to the central flow, whereby the long-chained polymer(s) or non-spherical particles are aligned in the flow direction; and c) Gelling of the aligned long-chained polymer(s) or non-spherical particles, through diffusion of salt, chelating agent or acid contained in the aligning flow streams, into the aligned long-chained polymer(s) or non-spherical particles, followed by coagulation of the gel string obtained, and/or d) Polymerization of a polymerizable component contained in the central flow dispersion; and e) Drying of the fibre obtained.

The invention does not make use of any co-flowing liquid significantly stretching the long-chained polymer(s) or non-spherical particles.

The at least two opposite, aligning flow streams are each located such that they have identical angles in relation to the central flow. The at least two opposite, aligning flow streams being essentially perpendicular to the central flow means that the angle between the central flow and each aligning flow stream is from 70° to 90°. The at least two aligning flow streams may be located such that they have identical angles to the central flow. Alternatively, there may be a difference of up to 10° between the two aligning flow streams, in relation to the central flow.

The person skilled in the art is well equipped to choose an appropriate angle, based on the characteristics and concentration of the flow dispersion.

The invention enables production of fibres from long-chained polymer(s) or non-spherical particles from the group of nanocellulose, polymeric protein(s), and carbon nanotubes, as contained in the flow dispersion. The flow dispersion may additionally comprise nano-clay or graphene.

The invention allows manufacture of strong filaments from e.g. wood fibre raw material for subsequent production of high performance bio-composites as well as for textile production. In the latter context, the filaments could be a replacement product for cotton and industrially produced viscose and Lyocell, and thereby significantly contribute to a reduced environmental footprint.

Figure 1:
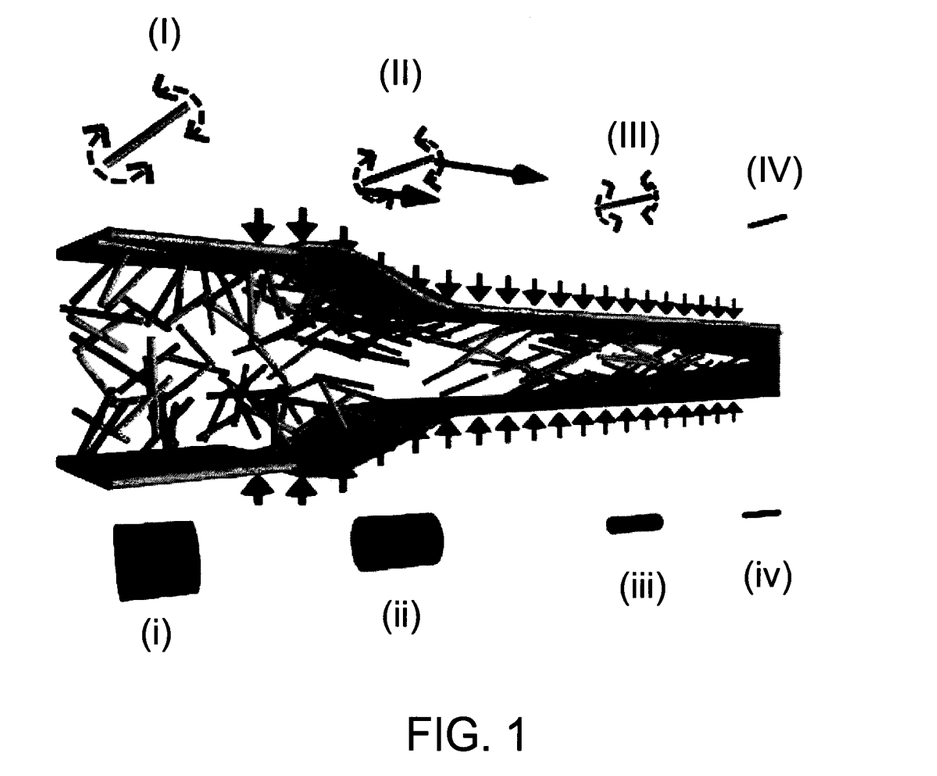

The principle behind the invention is shown stepwise in FIG. 1. Above and below the illustration of a flowing fibril suspension, the mechanical (above) and electrochemical (below) processes are illustrated. The spinning liquid is constituted of a dispersion of the constituents into a suitable liquid such as water (I). When the term "fibril" is used herein, it should be understood that this encompasses any non-spherical constituent that may be used in accordance with the invention, e.g. any long-chained polymer or non-spherical particle such as nanocellulose, a polymeric protein, or carbon nanotubes, unless specifically defined otherwise. The dispersion is characterized in that the fibrils are fairly free to rotate thanks to a sufficiently low concentration and electrostatic repulsion.

The dispersion is accelerated, which causes the fibrils to align in the flow direction (II). Before the alignment is lost due to Brownian diffusion (III), the electrostatic repulsion between the particles is reduced by an electrolyte diffusing into the suspension (ii-iv), which causes a gel to form and thus freezes the internal structure of the fibre (IV).

Hydrodynamical alignment can be achieved in different ways. The cross section of the central flow channel can be increased or decreased, imposing deceleration or acceleration, respectively, of the flow. As a consequence, fibrils will tend to orient themselves perpendicular (deceleration) or parallel (acceleration) to the flow direction.

In accordance with the invention, streams are merged and the fundamental principle of mass continuity controls the acceleration. In this case, acceleration is achieved with a minimum amount of shear, see FIG. 2. This figure illustrates what we define as a reaction chamber. In the reaction chamber, the central flow is accelerated as it is deformed by two opposite, aligning flow streams, which are injected with an high angle to the central flow. If the central flow contains fibrils, these will tend to align during the acceleration. If this forcing overcomes Brownian relaxation towards isotropy, an aligned structure will be created. Since the acceleration is controlled by continuity, the potentially detrimental shear is minimal.

Figure 3:
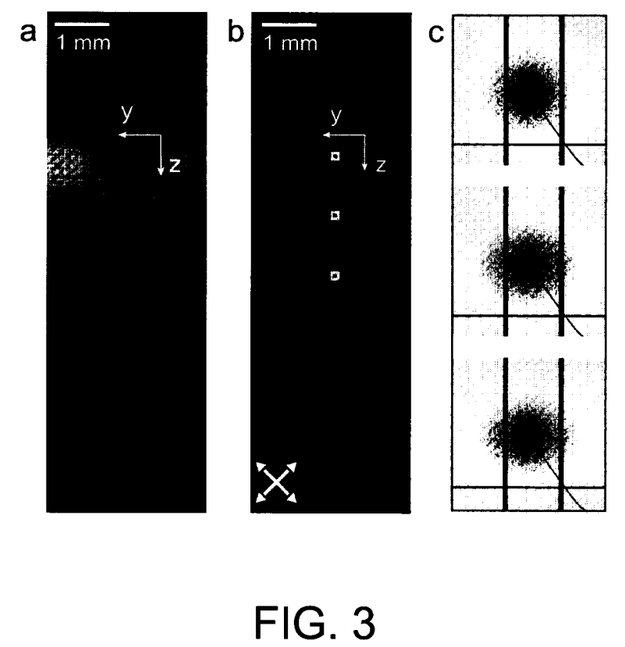
FIG. 3 shows images of the focusing region of the central flow channel, wherein the flow is directed downwards, in images (a) and (b). Water is focusing an ink-water mix in (a) and a NaCl solution is focusing a NFC dispersion in (b). The channel is in (b) placed between two crossed polarisation filters rotated 45° from the vertical axis (white arrows). To the right (c) SAXS diffractograms from before, during and after the acceleration in the channel, where the elliptical cloud corresponds to a constant intensity. The locations of each of the diffractiograms are marked with squares in figure (b).

In FIG. 3, the central flow is a NFC (nano fibrillar cellulose) dispersion and the fibrils are aligned by the acceleration. This alignment is visualized by polarized light visualizations in FIG. 3b, where the birefringence of the NFC dispersion results in higher intensity of the transmitted light in regions were the fibrils are aligned. The alignment is further demonstrated by small angle X-ray diffraction in FIG. 3c, wherein the lighter contours show that the initially isotropic structure (circle) is deformed further downstream. This deformation in small angle diffraction is a footprint of alignment on the nano level.

When the aligning streams contain electrolytes or an acid, ions will diffuse into the dispersion and eventually induce a gel transition at positions where the ion concentration has reached values above the gelation concentration threshold. For the case of nanocellulose this gel transition is due to a cancellation of the electrostatic repulsion between the fibrils, which originates from the carboxyl groups on the fibrils. As mentioned, the fibrils must be aligned before the structure is frozen by gelation while gelation must occur before the temporary flow-induced alignment is lost due to Brownian rotational diffusion. Furthermore, gelation must occur before the aligned fibre is convected out of the channel system. Thus, the below relations between the time scales 1-4 need to be fulfilled. The person skilled in the art is well qualified to ensure that the time scale conditions are fulfilled, based on the below guidance.

Figure 2:
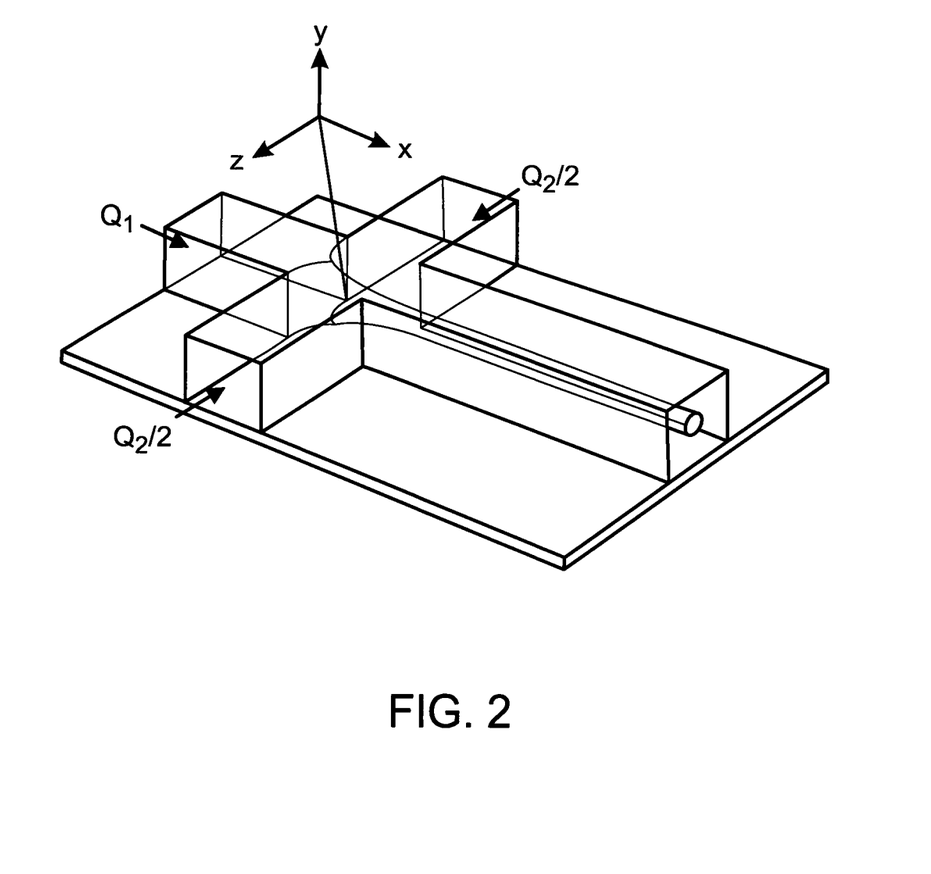
FIG. 2 shows a schematic drawing of the reaction chamber where $Q_1$ represents the central flow dispersion and $Q_2$ the aligning flow streams containing e.g. coagulants.

1. Alignment of the fibrils due to the flow focusing. An estimate for the time scale of this process is $t_{align} \sim 2h^3/Q_1$, where h is the channel size and $Q_1$ is the volumetric flow rate as indicated in FIG. 2.
2. Increase of ion concentration in the thread by diffusion, with the timescale $t_{ion}$~the time it takes for the ions to reach the core of the fibre that is forming in the channel. An estimate can be obtained as $t_{ion} \sim Ch^2/D_{ion}$, where $D_{ion}$ is the diffusivity and C is a constant that can be calculated numerically by solving the equations controlling the diffusion of ions into the forming fibre.
3. Brownian rearrangement of the fibrils towards isotropy. This is a diffusive process with a rotational diffusivity $D_{rot}$. The time scale of this process is $t_{rot} \sim \Delta\varphi^2/D_{rot}$ where $\Delta\varphi$ is the maximum de-alignment that can be accepted (here 22.5° is chosen). The diffusivity constant $D_{rot}$ is difficult to estimate from first principles; it can however be measured from a combination of flow orientation and the use of a polarized light setup. The fibrils of a NFC-dispersion is aligned (by water) in e.g. the flow focusing cell. By stopping the flow and measure the decay of the light intensity, $D_{rot}$ can be identified.
4. Convective transport of the suspension out of the channel, with the timescale $t_{conv} \sim Lh^2/(Q_1+Q_2)$, where L is the length of the outlet channel and $Q_1$, $Q_2$ are the volumetric flow rates rate as indicated in FIG. 2.

Note that the time scales are independent of the viscosities. In the case of shear induced acceleration, $t_{conv}$ would be viscosity dependent. In order to successfully form fibres the rough conditions on these time scales are that $t_{align} < t_{ion} < t_{rot}$ and $t_{ion} < t_{conv}$.

After forming the fibre in the reaction chamber, the fibre is gelled through diffusion of salt, chelating agent or acid contained in the aligning flow streams. The gelling salt, chelating agent or acid is chosen from the group consisting of organic acids, inorganic acids, water soluble complexing agents, organic salts, and inorganic salts. After gelling, the gel string obtained is coagulated. Coagulation may proceed inside the reaction chamber by addition of a coagulating agent or outside of the reaction chamber in a separate coagulating bath.

The gel string may be ejected from the central channel of the reaction chamber for subsequent coagulation. As an example the formed gel fibre is coagulated by either (i) passing a rinsing bath or (ii) through solvent exchange in e.g. acetone or alcohol. After this step the fibre may be dried in air.

Alternatively or in addition to the gelling and coagulation, a polymerizable component of the central flow may be polymerized, whereupon the fibre is dried. When the central flow dispersion is polymerized without prior gelling, such polymerization is effected in the reaction chamber. Polymerization may be effected through light, radiation, ultrasound, or heat. When the central flow comprises a polymerizable component, the aligning flow streams may be constituted by water. When the central flow dispersion comprises a polymerizable component, gelling and coagulation of the fibre formed may be dispensed with, and the polymerized fibre may proceed directly to drying.

In accordance with the invention, the gel string, coagulated gel string or polymerized gel string may be mechanically pulled to further enhance its properties. Pulling of the fibre may also make the method more industrially suitable.

Upon coagulation or polymerization, as the case may be, the fibre may proceed directly to a carbonization step. The fibre need not be dried before carbonization commences.

In order to successfully spin a fibre using the inventive method, a correct behaviour of the flow dispersion is necessary. Compared to traditional wet spinning techniques the concentration of the fibrils needs to be sufficiently low. Assuming that the dispersion is in the non-coagulated state, i.e. before entering into the reaction chamber, and if the concentration is too high there will be no alignment of the fibrils in the accelerating flow, due to strong mechanical interaction with surrounding fibrils. This entanglement is generally controlling the mobility of elongated particles, as described in e.g. Lundell, Söderberg and Alfredsson (2012) (7), through the so-called crowding factor N, which is given by $N=2/3*Cv*(L/d)^2$, where Cv is the volume fraction of the elongated particle with a characteristic length L and characteristic diameter d. Typically it is required that $N<60$ to assure mobility of the elongated particles in the suspension. In traditional spinning techniques on the other hand the viscosity and thus rheology should be high enough to prevent the break-up of the liquid column, formed by the spinning liquid ejected through the nozzle, due to the shear of the surrounding fluid.

The concentration of long-chained polymer(s) or non-spherical particles may in accordance with the invention be in the interval of 0.01-10% (w/w), counted on the total weight of the flow dispersion. Said concentration interval may be formed from two end points chosen from the following concentrations, which are all expressed as % (w/w) on the total weight of the flow dispersion: 0.01%; 0.05%; 0.1%; 0.5%; 1%; 2%; 3%;4%; 5%; 6%; 7%; 8%; 9%; 10%.

When nanofibrillar cellulose constitutes the sole content of the flow dispersion, its concentration should be <1% (w/w).

The person skilled in the art is able to choose a suitable concentration, based on e.g. the constituents of the flow dispersion and the above mentioned Crowding factor.

Moreover, the central flow of the reaction chamber must be hydrodynamically stable. Viscous confined jet/wake flows can be susceptible to loss of stability in certain parameter regions. This loss of stability causes self-sustained oscillations that are potentially detrimental for the fibre forming process.

Figure 4:
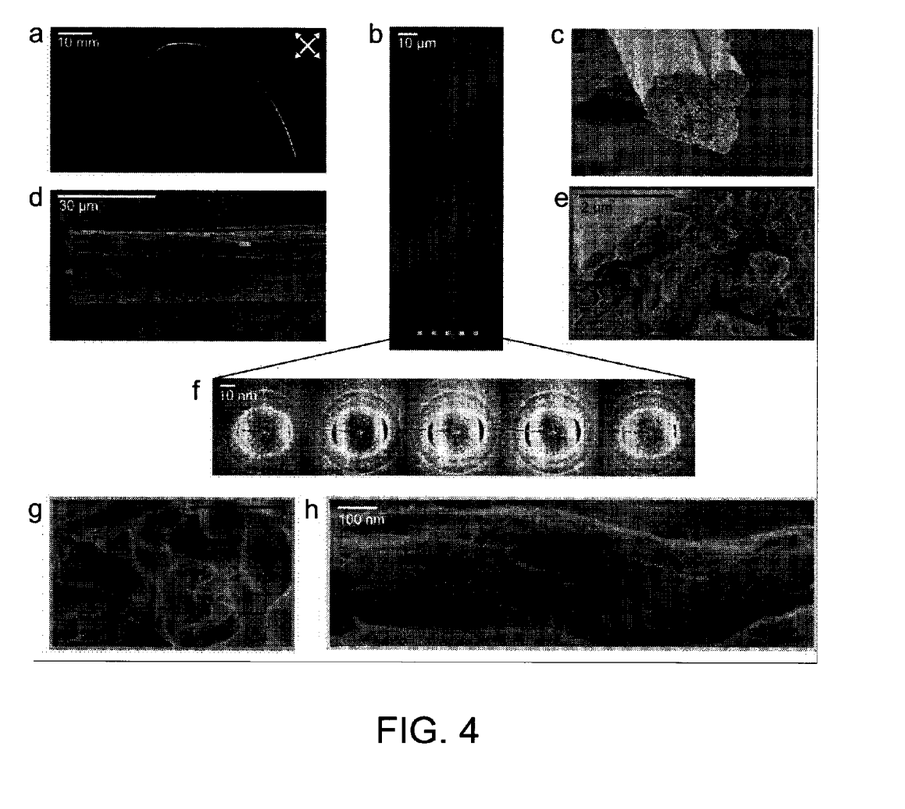
FIG. 4 shows images and diffractograms of dried fibre. (a) Image of a single filament placed between two crossed polarisation filters rotated 45° with respect to the vertical axis (white arrows). (b) Image of a filament in a light microscope. (c)-(e) and (g), (h), SEM images of a filament, where the outlined squares are close-ups and scale-bars are given in each image. (f) Diffractograms from a horizontal scan of the fibre shown in (b), where the fibre has a diameter of ~30 μm, the beam size is 1.5×1.2 μm² (Horizontally× Vertically) and the distance between two diffractograms is 6 μm (the region covered by each diffractogram is indicated with white rectangles in (b).

For the example with the fibre spun from nanofibrillar cellulose, FIG. 4 shows a photo in polarized light, SEM images and micro-focused wide angle X-ray diffractograms of the filament. The SEM images (c-e,g,h) show that the filament is void free and has a fairly constant cross section, although some irregularities are visible. Furthermore, the X-ray diffractograms in FIG. 4f, taken at different non-overlapping positions across the full width of the filament, reveal that the fibril orientation is distinct and does not vary across the filament, i.e. uniform properties. Thus, there is no skin-core effect and the data demonstrates that the filaments have a very homogeneous structure.

Figure 5:
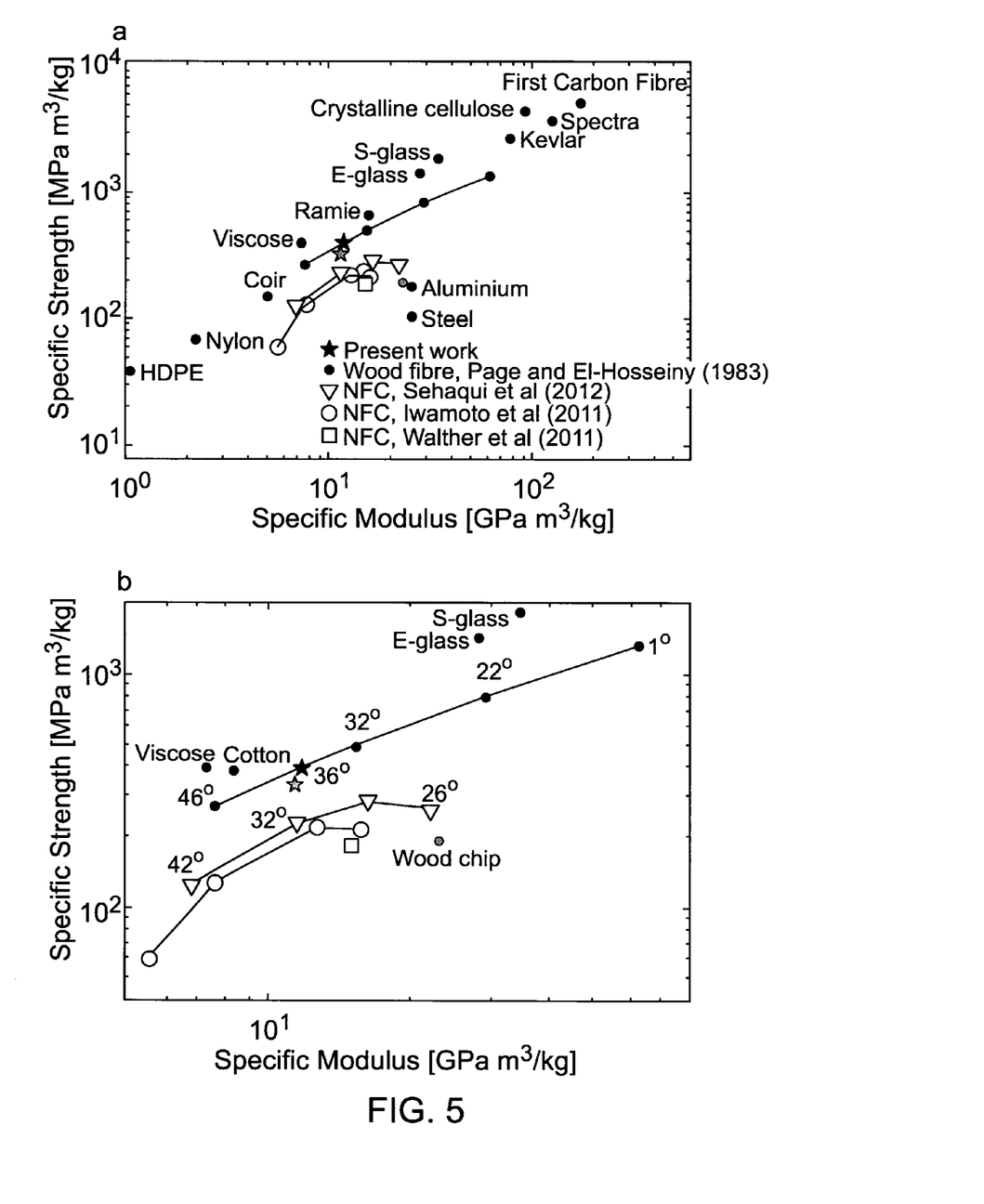

In FIG. 5 (overview in a) and close-up in b)) the specific ultimate strength as a function of specific Young's modulus for a wide range of fibre materials as well as steel and aluminium are shown. The filled, connected circles show data that have been obtained from stress-strain curves for bleached cellulose pulp fibres extracted from wood (herein also denoted cellulose pulp fibres). More recent experiments report lower values and the filled connected circles (and line) must therefore be considered as extremely good values. The filled connected circles correspond to different mean angles between the fibrils and the fibre (microfibrillar angle); this variation occurs naturally in different parts of a tree since the tree optimizes its structural integrity. The data points for cellulose pulp fibres appear near a line that also collects most of the other fibres from plastic fibres in the lower left, via natural fibres to stronger and stiffer synthetic fibres such as glass, Kevlar, Spectra and carbon fibres in the upper right. Note that cellulose pulp fibres with fully aligned fibrils can have a specific ultimate strength comparable to glass-fibres and a specific stiffness comparable to Kevlar.

The open connected markers (square, triangles and circles) show properties of fibres and films made from NFC (8, 9, 10). Filaments from NFC have been made by ejection of NFC gel from a nozzle (syringe) followed by coagulation and the fibril alignment is a function of the ejection speed. In these studies, the orientation is averaged over a millimetre-sized sample consisting of nanometre sized fibrils. It is therefore not possible to deduce the variation of the fibril orientation across the filaments. As for the natural cellulose fibre, the open symbols represent values that are among the best found in literature. Our filaments are shown with filled stars and reproduce the properties of the cellulose pulp fibres.

NFC materials of the present invention are by far superior to the state of the art man-made NFC based materials.

The central flow dispersion may be swirled or oscillated, either before acceleration of the flow dispersion, or during the acceleration, in the latter case by additional, oblique flow(s). Swirling or oscillation may be induced by introduction of geometrical modifications that break the symmetry of the flow conduits in the reaction chamber. Swirling or oscillation may be utilised to produce twisted fibres with non-circular cross sections.

Moreover, planar geometry of the reaction chamber allows the central flow channels to be extended in the direction perpendicular to the cross depicted in FIG. 2, which allows manufacture of a film instead of a fibre. The central flow channel would hence have a rectangular cross section.

The central flow may be constituted by multiple flow streams.

The above planar geometry also allows several reaction chambers to be stacked close together for the production of parallel fibres. The number of reaction chambers in parallel may be any number from 2 to 30, e.g. 5, 10, 15, 20, or 25.

Twisted fibres and films, respectively, cannot be produced by traditional spinnaret designs wherein the addition of coagulant liquids has to be made more or less axisymmetrically.

Sequential addition of liquids can be obtained by having several crosses adding to the central flow. This can be used to pre-treat the flow dispersion as well as to post-treatments of the gelled fibre in the flow channel of the reaction chamber. The pre-treatment with a cross directly before the reaction chamber allows e.g. a minor shear flow to be added before entering into the reaction chamber where the main acceleration takes place. This minimizes the risk of clogging the entrance channel and thus makes the manufacturing process more efficient. Post-treatment with a cross after the reaction chamber and gelling will allow e.g. stretching of the gel or rinsing of the gel fibre.

The oriented fibre or oriented sheet produced in accordance with the invention comprises long-chained polymer(s) or non-spherical particles. Such fibre or sheet may be carbonized.

The long-chained polymer(s) contained in the fibre is chosen from the group consisting of nanocellulose, a polymeric protein, and carbon nanotubes.

The oriented fibre or oriented sheet in accordance with the invention is void free and has a uniform orientation distribution radially. The oriented fibre or oriented film may moreover be layered and have different orientation in different layers.

The person skilled in the art realizes that alterations of the method described herein can be made without departing from the inventive concept.

REFERENCES

1. Turbak, A. F., Snyder F. W., and Sandberg K. R. 1983. "Microfibrillated Cellulose, a New Cellulose Product: Properties, Uses, and Commercial Potential." In A. Sarko (ed.) Proceedings of the Ninth Cellulose Conference, Applied Polymer Symposia, 37, New York, N.Y., USA: Wiley. pp. 815-827. ISBN 0-471-88132-5.
2. Olsson, R. T., Azizi Samir, M. A. S., Salazar-Alvarez, G., Belova, L., Ström, V., Berglund, L. A., Ikkala, O., Nogués, J. & Gedde, U. W. 2010, "Making flexible magnetic aerogels and stiff magnetic nanopaper using cellulose nanofibrils as templates", Nature Nanotechnology, vol. 5, no. 8, pp. 584-588.
3. Iwamoto, S., Isogai, A. & Iwata, T. 2011, "Structure and mechanical properties of wet-spun fibers made from natural cellulose nanofibers", Biomacromolecules, vol. 12, no. 3, pp. 831-836.
4. Sehaqui, H., Ezekiel Mushi, N., Morimune, S., Salajkova, M., Nishino, T. & Berglund, L. A. 2012, "Cellulose nanofiber orientation in nanopaper and nanocomposites by cold drawing", ACS Applied Materials and Interfaces, vol. 4, no. 2, pp. 1043-1049.
5. Jeffery, G. B. 1922. "The motion of ellipsoidal particles immersed in a viscous fluid". Proceedings of the Royal Society A 102 (715): 161-179.
6. Holm, R. & Söderberg, D. 2007, "Shear influence on fibre orientation", Rheologica Acta, vol. 46, no. 5, pp. 721-729.
7. Lundell, F., Söderberg, L. D. & Alfredsson, P. H. 2011 Fluid mechanics of papermaking, Annual Review of Fluid Mechanics, 47, 195-217.
8. Iwamoto, S., Isogai, A. & Iwata, T. 2011, "Structure and mechanical properties of wet-spun fibers made from natural cellulose nanofibers", Biomacromolecules, vol. 12, no. 3, pp. 831-836.
9. Walther, A., Timonen, J. V. I., Díez, I., Laukkanen, A. & Ikkala, O. 2011, "Multifunctional high-performance biofibers based on wet-extrusion of renewable native cellulose nanofibrils", Advanced Materials, vol. 23, no. 26, pp. 2924-2928.
10. Sehaqui, H., Ezekiel Mushi, N., Morimune, S., Salajkova, M., Nishino, T. & Berglund, L. A. 2012, "Cellulose nanofiber orientation in nanopaper and nanocomposites by cold drawing", ACS Applied Materials and Interfaces, vol. 4, no. 2, pp. 1043-1049.

The invention claimed is:

1. Method of spinning fibres or extrusion, comprising
   a) Injection of a central flow dispersion comprising long-chained polymer(s) or non-spherical particles into a central flow channel of a reaction chamber;
   b) Acceleration of the central flow in the reaction chamber by at least two opposite, aligning flow streams, essentially perpendicular to the central flow, whereby the long-chained polymer(s) or non-spherical particles are aligned in the flow direction; and
   c) Gelling of the aligned long-chained polymer(s) or non-spherical particles, through diffusion of salt, chelating agent or acid contained in the aligning flow streams, into the aligned long-chained polymer(s) or non-spherical particles, followed by coagulation of the gel string obtained, and/or
   d) Polymerization of a polymerizable component contained in the central flow dispersion; and
   e) Drying of the fibre obtained.
2. Method according to claim 1, wherein the central flow is constituted by multiple streams.
3. Method according to claim 1, comprising at least two reaction chambers in parallel.
4. Method according to claim 3, wherein the number of reaction chambers in parallel is 3-30.
5. Method according to claim 1, wherein the long chained polymer(s) or nonspherical particles in (a) are nanocellulose, a polymeric protein, or carbon nano tubes.
6. Method according to claim 1, wherein the flow dispersion in (a) additionally comprises nano clay or graphene.
7. Method according to claim 1, wherein the flow dispersion in (a) has a concentration of 0.01-10% (w/w) of long-chained polymer(s) or non-spherical particles.
8. Method according to claim 1, wherein the aligning flow streams are constituted by water, and the central flow comprises a polymerizable component.
9. Method according to claim 1, wherein in (c) the gelling salt, chelating agent or acid is chosen from the group consisting of organic acids, inorganic acids, water soluble complexing agents, organic salts, and inorganic salts.
10. Method according to claim 1, wherein in (c) the coagulation proceeds inside the reaction chamber by addition of a coagulating agent or outside of the reaction chamber in a separate coagulating bath.
11. Method according to claim 1, wherein the coagulation is effected by immersion of the gel string into acetone or alcohol.
12. Method according to claim 1, wherein in (d) the polymerization is effected in the reaction chamber through light, radiation, ultrasound, or heat.
13. Method according to claim 1, wherein the reaction chamber(s) have rectangular cross section(s).
14. Method according to claim 1, wherein the central flow dispersion is swirled or oscillated, either before step (b), or in step (b) by additional, oblique flow(s).
15. Method according to claim 14, wherein the flow dispersion is swirled or oscillated by a change of geometry in the reaction chamber.
16. Method according to claim 1, wherein the fibre obtained is carbonized.
17. Method according to claim 1, wherein the diffusion of salt, chelating agent or acid contained in the aligning flow streams comprises diffusion of ions of the salt, chelating agent or acid contained in the aligning flow streams.

* * * * *